United States Patent [19]

Stuemky

[11] 3,973,411
[45] Aug. 10, 1976

[54] COUPLING FOR FLEXIBLE SHAFT ELEMENT

[75] Inventor: Robert E. Stuemky, Elizabeth, Colo.

[73] Assignee: The Gates Rubber Company, Denver, Colo.

[22] Filed: Oct. 28, 1975

[21] Appl. No.: 625,970

[52] U.S. Cl. .................................. 64/4; 285/256; 285/114; 403/285; 29/508; 64/11 R; 64/6; 64/3
[51] Int. Cl.² ...................................... F16C 1/26
[58] Field of Search ............. 64/4, 3, 2, 1 V, 11 R, 64/27 NM, 6; 285/256, 257, 114; 403/285, 284, 274; 29/508

[56] References Cited
UNITED STATES PATENTS

| | | |
|---|---|---|
| 1,944,890 | 1/1934 | Heidloff .............................. 285/256 |
| 2,099,915 | 11/1937 | Weatherheald, Jr. ...................... 64/3 |
| 2,170,627 | 8/1939 | Berryman ............................. 64/11 R |
| 2,584,948 | 2/1952 | Weatherhead, Jr. ................. 285/256 |
| 3,145,464 | 8/1964 | Green ................................ 64/11 R |
| 3,788,098 | 1/1974 | Miller et al. ............................. 64/3 |

Primary Examiner—Samuel Scott
Assistant Examiner—Randall Heald
Attorney, Agent, or Firm—H. W. Oberg, Jr.; Raymond Fink; Curtis H. Castleman, Jr.

[57] ABSTRACT

A coupling for a tubularly shaped flexible shaft element, the coupling having a generally cup shape with a sleeve for receiving the flexible shaft element and an integral bottom portion with circumferentially spaced apertures disposed near the integral sleeve.

16 Claims, 6 Drawing Figures

COUPLING FOR FLEXIBLE SHAFT ELEMENT

BACKGROUND OF THE INVENTION

The invention relates to flexible shaft couplings of the tubularly shaped flexible element type, but more particularly, the invention relates to a coupling for connecting and transmitting torque to and from the flexible element.

Couplings are used as means for transferring torque to or from a tubularly shaped flexible element. Examples of such couplings are proffered in U.S. Pats. Nos. 3,628,352 and 3,788,098. While such couplings are suitable for transferring torque to and from a flexible element, they are difficult to assemble, or manufacture, and they are somewhat expensive.

SUMMARY OF THE INVENTION

The "cup-shaped" coupling of the invention includes a generally cylindrical sleeve that is interconnected to a radial wall portion which forms the bottom of the cup. The radial wall has a plurality of circumferentially spaced apertures that are disposed near the sleeve. The sleeve has a fluted edge at its exterior juxtaposed the bottom portion where flutes of the sleeve are alternately circumferentially spaced from apertures of the radial wall. The radial wall portion inbetween the apertures define webs that are radially crushable as the sleeve is swaged or crimped. The one-piece construction of the coupling permits economical manufacture such as by sintering, sand casting, die casting, or cold forming.

An object of the invention is to provide a coupling that is of one-piece construction and which may be swaged or crimped without serious deformation of either the central portion of the radial wall or a cast or pressed-in insert of the radial wall.

Another object of the invention is to provide a coupling that is easy to assemble with a tubularly shaped flexible element.

Another object of the invention is to use easily formable die casting metals with high modulus inserts which effect a coupling of high torque transmitting capabilities.

The advantage of the invention is that couplings may be quickly manufactured at a low cost from easily formed materials to yield a coupling having a quality level equivalent to that of a coupling formed with more expensive materials or methods of manufacture.

A salient advantage of the invention is that it yields an assembly with esthetic appeal.

These and other objects or advantages of the invention will be more apparent after reviewing the drawings and description thereof wherein.

DESCRIPTION OF PREFERRED EMBODIMENTS

Figure 2:
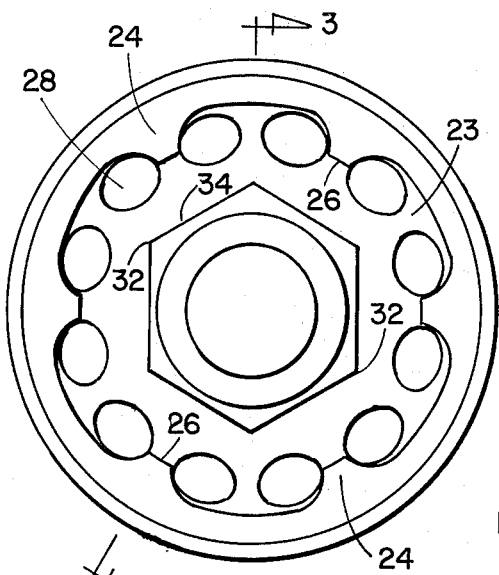
FIG. 2 is a full end view taken generally along the line 2—2 of FIG. 1.
Figure 3:
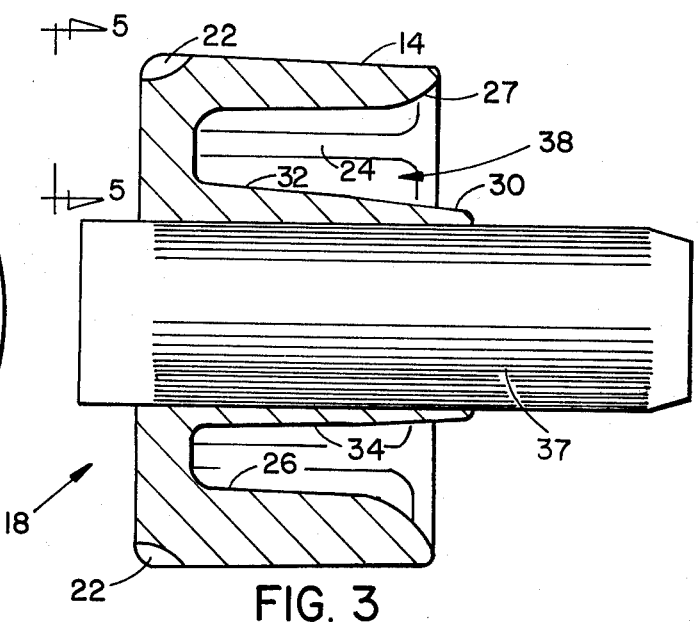
FIG. 3 is a sectional view taken along the line 3—3 of FIG. 2 and including an optional insert.

In accordance with the invention a coupling 10 is provided for transmitting torque to and from a tubularly shaped flexible element 12 such as disclosed in U.S. Pat. No. 3,628,352. Referring to the drawings, the coupling has a generally "cup" shape and includes a sleeve 14 that is integrally interconnected through a generally radial wall 16 that forms the bottom portion 18 of the coupling.

The sleeve 14 is fluted 20 along its bottom external edge with flutes 22 that axially extend along the external portion of the sleeve a distance which is at least generally equal to the axial thickness of the radial wall 16, but the flutes may extend along the length of the sleeve. The flutes taper from the external wall to the radial wall of the bottom portion. Preferably, the flutes 22 are substantially equally circumferentially spaced around the bottom edge. The number of flutes may be varied as desired in a relationship that corresponds with the diameter of the sleeve. For a 3 to 3½ inch sleeve, twelve flutes have proven satisfactory.

A plurality of axially aligned internal ribs 24 project from the internal wall of the sleeve. Preferably, the ribs have generally flattened surfaces 26 which diverge from the bottom. There are preferably half as many sleeve ribs as flutes; there is at least one flute interpositioned between successive sleeve ribs. The internal rim of the sleeve is chamfered 27 such as by radiusing, beveling or the like for receiving and coacting with a flexible element which will later be explained.

The sleeve 14 integrally interconnects with the radial wall 16 that defines a bottom portion of the coupling. The radial wall has a plurality of preferably oval or elliptical shaped apertures 28 that are circumferentially spaced. The apertures are successively spaced in a circumferential manner from the flutes 22 such that a radial web 23 is formed in the bottom portion which is in radial alignment with a flute.

Optionally, but preferably, an integral hub 30 extends from the bottom portion in axial alignment with the sleeve. The hub has a plurality of ridges 32 that are axially aligned. The ridges taper from the bottom portion in a converging manner. The surface 34 of the hub between the ridges may be concave, convex, undulating, etc., or flat to define generally flat facets. The ridges are substantially equally spaced and are indexed to successively alternate with the circumferential facing of the sleeve ribs.

An advantage of the invention is that the coupling may be die cast with material such as aluminum or its alloys. However, material such as aluminum may not have the desired modulus to satisfactorily work with a steel splined shaft. Also, the aluminum may set up an electrical couple with the steel. To solve such problems, an insert 36 may be die cast with the coupling or the insert may be pressed into the coupling after it has been formed. The insert serrations 38 extend into the hub to enhance torque transmitting capability between the two parts. The insert may include an internal or external spline for interfacing with and connecting to a shaft.

The converging ridges 32 of the hub and diverging ribs 24 of the sleeve define a generally divergently tapered annulus 38 for receiving and gripping the end of a tubularly shaped flexible element.

Figure 4:
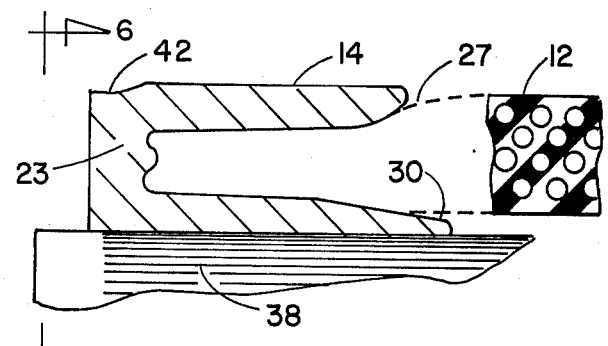
FIG. 4 is a partial view similar to FIG. 3 but showing the coupling after radial deformation and with a flexible element.
Figure 1:
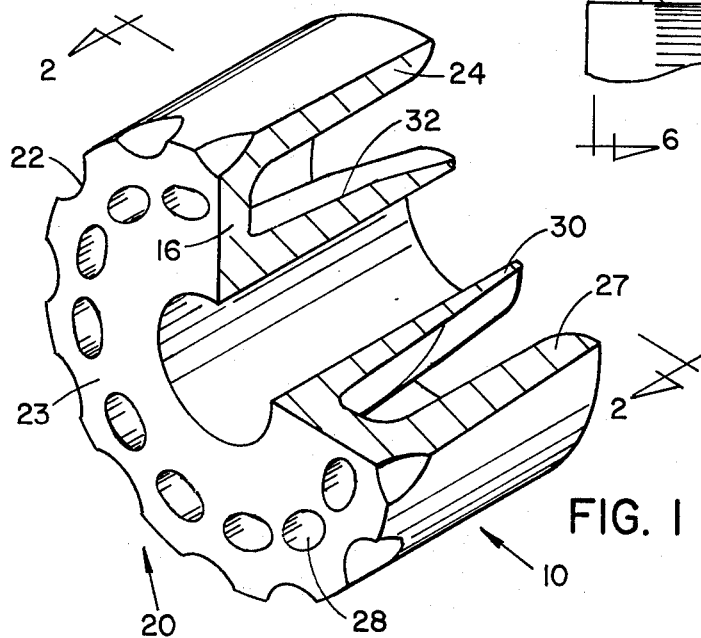
FIG. 1 is a partially cut away isometric view showing the coupling of the invention.
Figure 5:
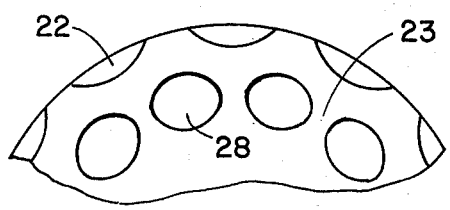
FIG. 5 is a partial view taken along the line 5—5 of FIG. 3.
Figure 6:
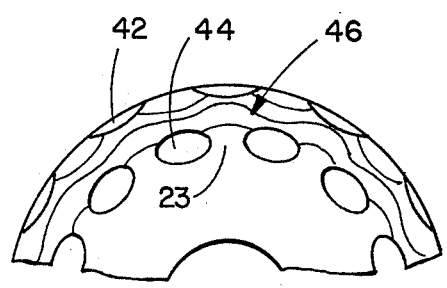
FIG. 6 is a partial view taken along the line 6—6 of FIG. 4.

When used, a tubularly shaped flexible element 12 is inserted in the coupling over the hub. Preferably, the internal diameter of the flexible element is slightly smaller than the maximum diameter of the ridges 32 of the hub. However, the internal diameter of the ribs 24 is preferably slightly larger than the external diameter of the element. After the flexible element is positioned within the tapered annulus, the sleeve is reduced to a smaller external diameter (i.e., about 12 percent or ⅜ inch for a 3½ inch diameter coupling) by swaging, crimping, or the like. The radially inward forces imparted to the sleeve crush 40 the webs 23 and distort and flutes 22 outwardly 42 and apertures inwardly 44 to define an undulating grain 46 structure at the bottom edge of the coupling. The crushing of the webs and distortion of the flutes changes the shape of the apertures as exemplified by FIGS. 4 and 6. The radial wall portion inward of the webs 23 substantially remains intact and is unaffected by the crushing forces. Accordingly, the large compressive forces of swaging or crimping do not distort the hub, crush the insert or significantly affect the stress levels between the hub and insert. Were the apertures and optionally the flutes not to be provided, the radial wall portion would crack as well as the hub to render a useless coupling.

The distorted sleeve presses against the flexible element gripping the reinforcement thereof. The offset spacing between the ribs and ridges cause the flexible element to distort in an undulating manner which defines a positive mechanical interface between the coupling and flexible element for improved torque transmission. The chamfered edge 27 of the sleeve allows the flexible element to be distorted without concentrated stresses and to bend to an operating angle with less distress at the coupling edge.

The distorted apertures may be machined for receiving fasteners to connect the coupling to other rotatable shaft members. For example, the apertures may be drilled and tapped for receiving threaded fasteners.

The foregoing detailed description is made for purpose of illustration only and it is not intended to limit the scope of the invention which is to be determined from the appended claims.

What is claimed is:

1. A coupling comprising:
 a one-piece cup including a sleeve integrally interconnected to a generally radial wall that defines a bottom portion of the cup, the sleeve having an exteriorly fluted edge juxtaposed the bottom portion and the radial wall having a plurality of circumferentially spaced apertures.

2. The coupling of claim 1 wherein flutes of the fluted edge are circumferentially spaced from the apertures.

3. The coupling of claim 2 which further comprises a plurality of axially oriented ribs spaced and disposed interiorly of the sleeve.

4. The coupling of claim 3 wherein there are an equal even number of flutes and apertures and wherein there are half as many ribs as flutes, the ribs radially aligned with every other flute.

5. The coupling of claim 1 which further comprises a hub disposed in the cup, axially aligned with the sleeve and secured to the bottom portion.

6. The coupling of claim 4 which further comprises a hub disposed in the cup, axially aligned with the sleeve and secured to the bottom portion, the hub including axially oriented ridges that are circumferentially offset from the ribs.

7. The coupling of claim 1 wherein the apertures are of a generally elliptical shape.

8. The coupling of claim 6 wherein the hub between the ridges define facets that are generally flat.

9. The coupling of claim 3 wherein the ribs have generally flat exterior surfaces.

10. The coupling of claim 9 wherein the exterior surfaces of the ribs diverge from the bottom portion.

11. The coupling of claim 6 wherein the ridges of the hub generally converge from the bottom portion.

12. The coupling of claim 4 wherein the radial wall portions between apertures define webs, the webs radially crushed to define bulged surfaces thereon.

13. The coupling of claim 5 which further comprises a tubular insert coaxially disposed within and secured to the hub.

14. The coupling of claim 12 wherein the bottom portion radially past the webs has a grain structure that is circumferentially undulating.

15. The coupling of claim 1 wherein the cup is made of aluminum.

16. The coupling of claim 1 wherein the sleeve has an internal chamfer at the cup rim.

* * * * *